(12) United States Patent
Sousa

(10) Patent No.: US 9,472,936 B2
(45) Date of Patent: Oct. 18, 2016

(54) NONMETALLIC SHEATHED ELECTRICAL CABLE MOUNTING

(71) Applicant: Joe Sousa, Victoria (CA)

(72) Inventor: Joe Sousa, Victoria (CA)

( * ) Notice: Subject to any disclaimer, the term of this patent is extended or adjusted under 35 U.S.C. 154(b) by 0 days.

(21) Appl. No.: 14/499,212

(22) Filed: Sep. 28, 2014

(65) Prior Publication Data

US 2016/0091119 A1 Mar. 31, 2016

(51) Int. Cl.
*F16L 3/10* (2006.01)
*H02G 3/30* (2006.01)
*H02G 3/06* (2006.01)

(52) U.S. Cl.
CPC .............. *H02G 3/30* (2013.01); *H02G 3/0633* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,531,423 A * | 3/1925 | Simpson | ................ | H02G 3/125 174/70 R |
| 1,760,663 A * | 5/1930 | Rosenfield | ........... | H02G 3/0683 220/3.2 |
| 2,084,961 A * | 6/1937 | Bondeson | ............ | H02G 3/0683 285/154.3 |
| 2,097,695 A * | 11/1937 | Kingdon | .............. | H02G 3/0683 285/154.4 |
| D112,622 S * | 12/1938 | Steiner | ............................ | D8/371 |
| 2,552,149 A * | 5/1951 | Clark | ................... | H02G 3/0683 285/154.3 |
| 3,149,811 A * | 9/1964 | Gorton | ................. | A47B 61/003 211/162 |
| 3,210,816 A * | 10/1965 | Clemons | ................ | A61C 19/00 128/852 |
| 3,606,409 A * | 9/1971 | Hawkins | ............... | F16B 7/1418 248/411 |
| 3,788,582 A * | 1/1974 | Swanquist | ........... | H02G 3/0658 174/153 G |
| 4,050,205 A * | 9/1977 | Ligda | ...................... | E04G 21/30 174/507 |
| 4,066,372 A * | 1/1978 | Swanson | ............. | E04H 12/2292 174/45 R |
| 4,140,413 A * | 2/1979 | Conrad | ..................... | F16D 1/09 279/16 |
| 4,800,696 A | 1/1989 | Miller | | |
| 5,022,104 A * | 6/1991 | Miller | ..................... | A47K 3/38 160/330 |
| 5,141,185 A | 8/1992 | Rumbold | | |
| 5,188,318 A | 2/1993 | Newcomer | | |
| 5,406,032 A * | 4/1995 | Clayton | ................. | H02G 3/083 174/151 |
| 5,594,202 A * | 1/1997 | Tobias | ..................... | H02G 3/22 174/505 |
| 5,763,832 A * | 6/1998 | Anselm | ............... | H02G 3/0625 174/135 |

(Continued)

*Primary Examiner* — Monica Millner
(74) *Attorney, Agent, or Firm* — Robert S. Smith

(57) ABSTRACT

A bracket for securing an NM cable includes a generally planar member having a bore having a first diameter defined therein; a sleeve having an inside diameter that is greater than said first diameter, the sleeve is coupled to the bore; and a collar is disposed within the sleeve and substantially abuts the generally planar member, the collar has an outside diameter that allows insertion within the sleeve and an inside diameter that is smaller than the outside diameter thereof whereby the flexible metallic sheathing of an associated cable will abut the collar and the conductors thereof will pass through the collar and the bore. In addition the bracket may include a clamp on the sleeve dimensioned and configured for engaging the outer surface of an associated flexible metallic conduit.

2 Claims, 3 Drawing Sheets

(56) References Cited

U.S. PATENT DOCUMENTS

| | | | | |
|---|---|---|---|---|
| 6,155,743 A * | 12/2000 | Chen | | F16B 7/1418 248/161 |
| 6,180,882 B1 * | 1/2001 | Dinh | | H02G 3/22 16/2.2 |
| 6,375,017 B1 * | 4/2002 | Schattner | | A61M 5/1418 211/70 |
| 6,578,804 B2 * | 6/2003 | Lin | | A47C 7/004 248/188.1 |
| 6,595,473 B2 * | 7/2003 | Aoki | | B60R 16/0215 138/108 |
| 6,723,918 B2 * | 4/2004 | Vrame | | H02G 3/123 174/50 |
| 6,800,806 B1 | 10/2004 | Grday | | |
| 6,875,918 B2 * | 4/2005 | Sudo | | H02G 3/06 138/108 |
| 6,979,779 B2 | 12/2005 | Grady | | |
| 6,996,943 B2 | 2/2006 | Denier | | |
| 7,906,726 B1 * | 3/2011 | Burkett | | H02G 3/0418 174/68.1 |
| 8,013,248 B2 * | 9/2011 | Sakata | | B60R 16/0215 174/40 CC |
| 8,698,011 B2 * | 4/2014 | Schlegel | | H02G 3/0675 174/652 |
| 8,708,738 B1 * | 4/2014 | Connolly | | H02G 3/0683 439/580 |
| 9,144,315 B1 * | 9/2015 | Cheng | | A47C 7/506 |
| 9,252,578 B2 * | 2/2016 | Korcz | | H02G 3/0691 |
| 2005/0011996 A1 | 1/2005 | Geater | | |

* cited by examiner

NONMETALLIC SHEATHED ELECTRICAL CABLE MOUNTING

TECHNICAL FIELD

The present invention is generally directed to a mounting for a nonmetallic sheathed electrical cable to prevent mechanical damage. Many installations of nonmetallic sheathed cable occur within walls where the cable is protected by the wall from mechanical damage. The present invention is directed to special situations when the nonmetallic sheathed cable may extend through a wallboard for connection to an appliance such as a hot water heater. Building codes require in some cases that electrical power connections to electric water heaters and boiler systems have armored cable to connect electric power.

BACKGROUND OF THE INVENTION

The invention will be better understood with a definition of the types of electrical cable used in both residential and commercial applications. Romex and Lumex are trademarks used to identify particular brands of plastic insulated wire which is also sometimes called non-metallic sheathed cable. Such cables may have 2 or more conductors and the plastic sheathing may be PVC. The formal name is NM cable. Such cable is suitable for use in dry, protected areas (i.e. inside stud walls and on the sides of joists etc.), that are not subject to mechanical damage or excessive heat. Most contemporary homes are wired almost exclusively with NM cables. There are several different categories of NM cable.

NM cable differs from BX cable technically known as armored cable or "AC" that has a flexible aluminum or steel sheath over the conductors and is fairly resistant to damage. Still other cable is surrounded by a rigid metallic conduit. Such cable is required for more hostile environments than the environments in which NM cable is used such as when some moisture is present or the cable is subject to mechanical damage or excessive heat.

Some contractors may extend an NM cable through a wallboard in a manner that only loosely surrounds the cable. Accordingly, the NM cable is more vulnerable to damage than when the same cable is installed within a wall where the cable is protected by wallboard and studs. In addition, the loose engagement of the AC cable with the exterior with a hole that is too large will inherently compromise the integrity of the building fire wall or break. Even installations of junction boxes that extend through the wall board typically have an imperfectly sized and/or shaped hole in the wall board that also compromises the integrity of the building fire wall or break.

Known mounting brackets do not securely mount the AC cable to protect the cable from damage and often do compromise the integrity of the building fire wall or break. Other prior art techniques utilize sleeves and lock nuts to attach the AC cable to junction boxes. Such arrangements are relatively complex and expensive to install. In some cases the mounting of a junction box with conductors that extends through a firewall will compromise the firewall. Thus, it is therefore seen that there exists a need in the art to overcome the deficiencies and limitations described herein and above.

SUMMARY OF THE INVENTION

The shortcomings of the prior art are overcome and additional advantages are provided by apparatus in accordance with one form of the present invention that is a mounting for nonmetallic shielded cable sometimes referred to as NM cable. The mounting includes a plate having a bore through the plate that is coaxial with the clamp. In use the bore is positioned in coaxial relationship with a bore in a wallboard and a nonmetallic sheathed cable may extend through the bore in the wall board and the bore in the plate and engages the flexible metallic conduit being held by the clamp. The plate is provided with holes for receiving fasteners to engage the wallboard.

More specifically, one form of the present invention for securing/mounting an NM cable includes a generally planar member having a first bore having a first diameter defined therein; a housing having a second bore therein that is substantially aligned with the first bore. A collar is disposed within the housing that substantially abuts the generally planar member. The collar has a third bore extending through the collar that is large enough to allow passage of respective conductors of an associated cable and small enough to prevent passage of a flexible metallic sheath surrounding the respective conductors whereby the flexible metallic sheathing of an associated cable will abut the collar and the conductors thereof will pass through the third bore in the collar and the first bore in the plate. In addition the bracket may include a clamp on the sleeve dimensioned and configured for engaging the outer surface of section of the associate flexible metallic sheath surrounding an axial part of the associated NM Cable.

In some embodiments of the present invention the housing 18 or 118 holds the flexible metallic conduit or sheath 152 is substantial parallel to the plate 114 as shown in FIGS. 2 and 3 instead of being substantially perpendicular as shown in FIG. 1.

The invention also includes the method for mounting a nonmetallic sheathed cable protruding from a wallboard which includes providing a mounting for securing the cable which includes providing a generally planar member having a bore having a first diameter defined therein; providing a housing having a second bore, substantially aligning the first and second bores. In some embodiments the method includes positioning the axis of the second bore in substantially perpendicular relationship to said generally planar member as well as in substantially coaxial relationship with the first bore. The method also includes providing a collar disposed within the housing that substantially abuts the generally planar member and also providing such a collar that has a third bore there that is that is large enough to allow passage of respective conductors of an associated cable and small enough to prevent passage of a flexible metallic sheath surrounding the respective conductors whereby the flexible metallic sheathing of an associated cable will abut the collar and the conductors thereof will pass through the third bore in the collar and the first bore in the plate.

The method may also include providing a clamp on the housing that is dimensioned and configured for engaging the outer surface of the associated flexible metallic conduit as well as sliding the mounting along the axial extent of the protruding nonmetallic sheathed cable and placing the generally planar member in face-to-face contact with the wallboard; sliding an axial section of flexible metallic conduit over the protruding nonmetallic sheathed cable and securing the clamp to the flexible metallic conduit and securing the generally planar member to the wallboard.

Accordingly, it is an object of the present invention to provide a mounting for a non-metallic sheathed cable that securely holds the non-metallic sheathed cable securely and thereby insures the integrity of the non-metallic sheathed cable.

It is another object of the present invention to provide a secure mounting for NM cable passing through a firewall that preserves the integrity of the firewall.

It is yet another object of the present invention to provide a mounting that is very simple and easy to install.

It is a still further object of the present invention to provide a mounting that is very inexpensive to construct.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing which includes

DETAILED DESCRIPTION

The apparatus is a mounting for a flexible non-metallic sheathed cable. The mounting for the nonmetallic sheathed cable cooperates with an axial section of flexible metallic conduit. The flexible metallic conduit is typically commercially available in rolls. Flexible metallic conduit will be understood to be substantially identical to the outer covering used on the so-called BX cable.

Figure 1:
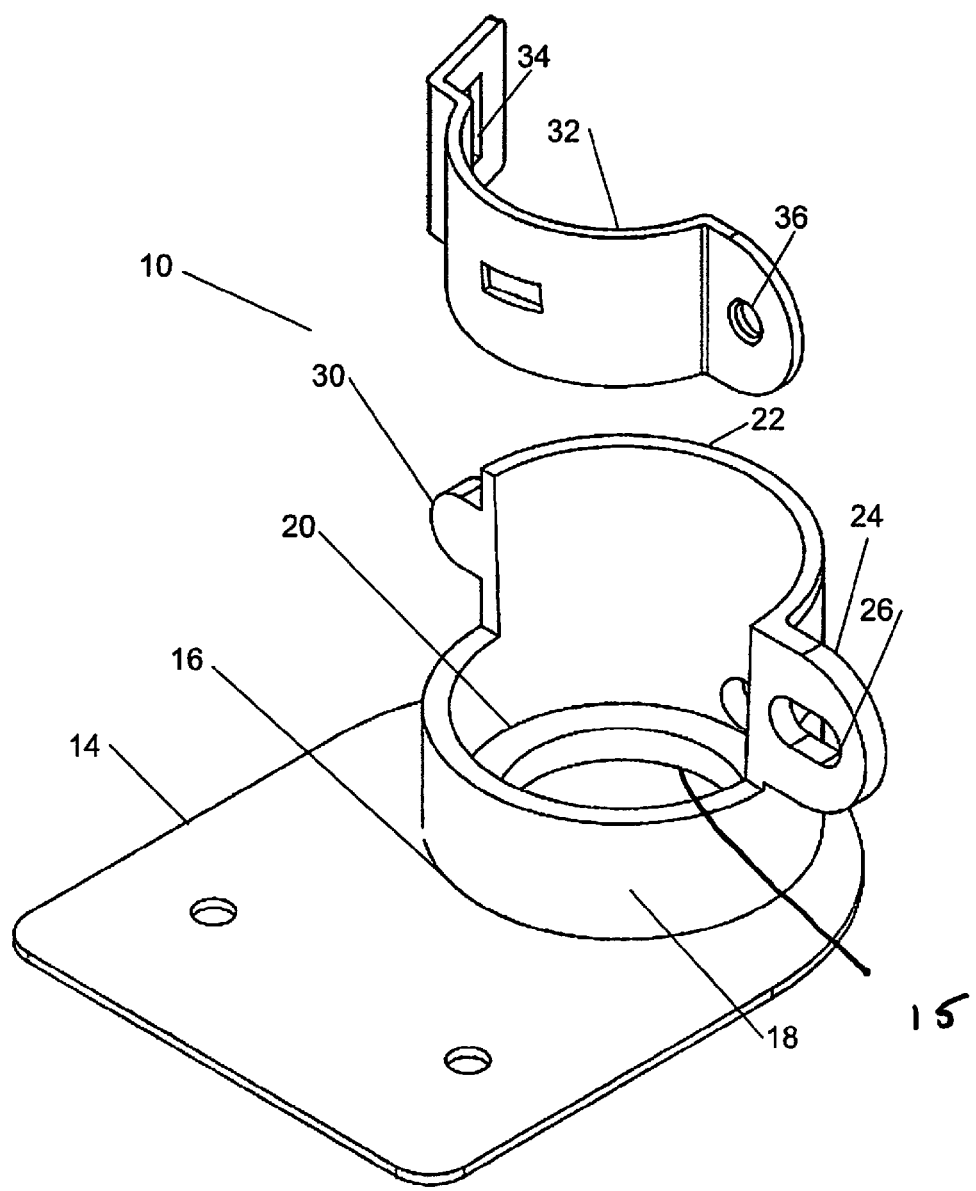
FIG. 1 is a perspective view of a first embodiment of connector for connecting an armored electrical cable to a non-metallic sheathed cable and mounts the cable in substantially perpendicular relationship to a wall which may include wallboard.
Figure 2:
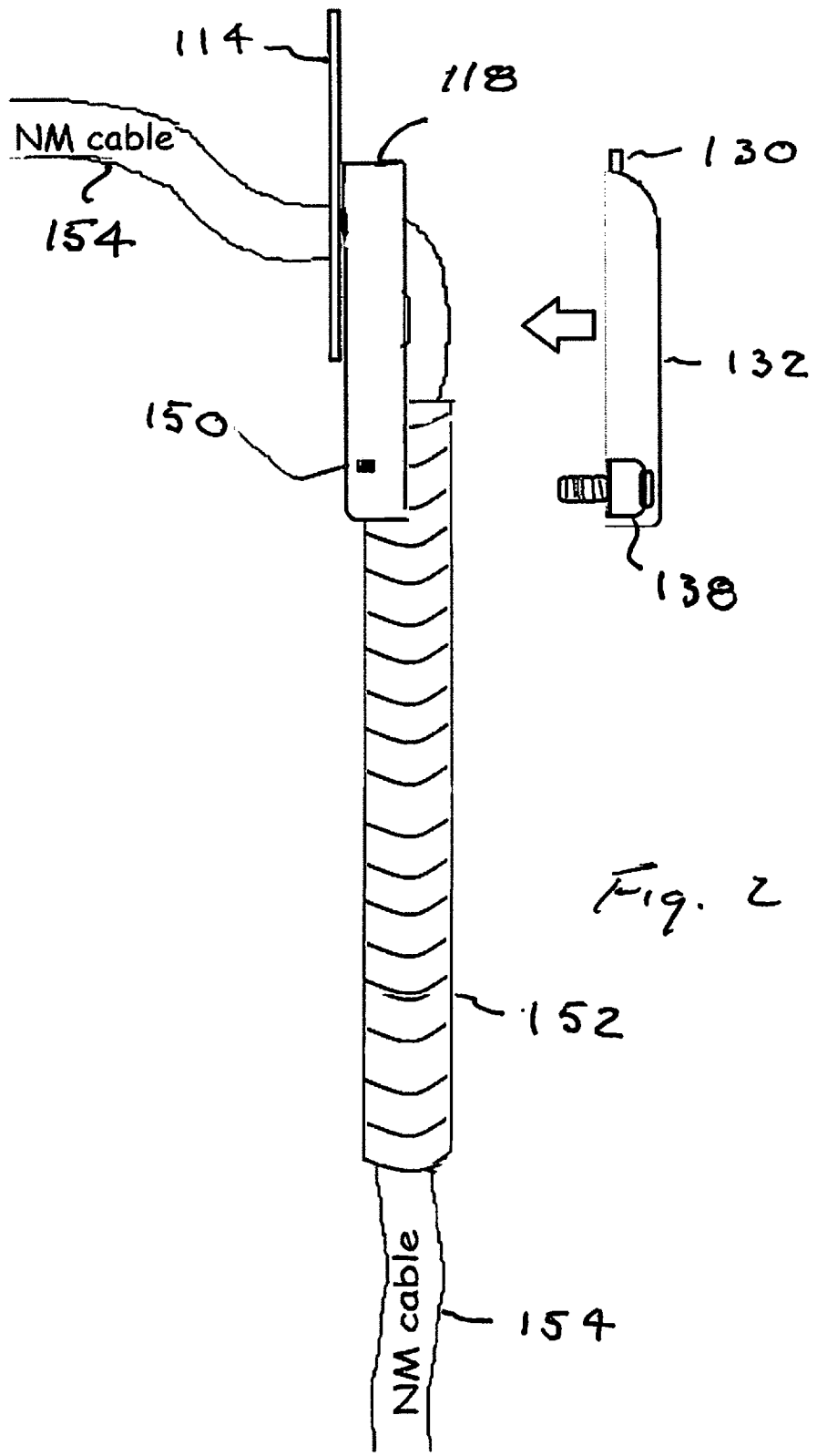
FIG. 2 is an exploded side view of a second embodiment of the connector that holds the cable in a position that is generally parallel to a wall which may include wallboard.
Figure 3:
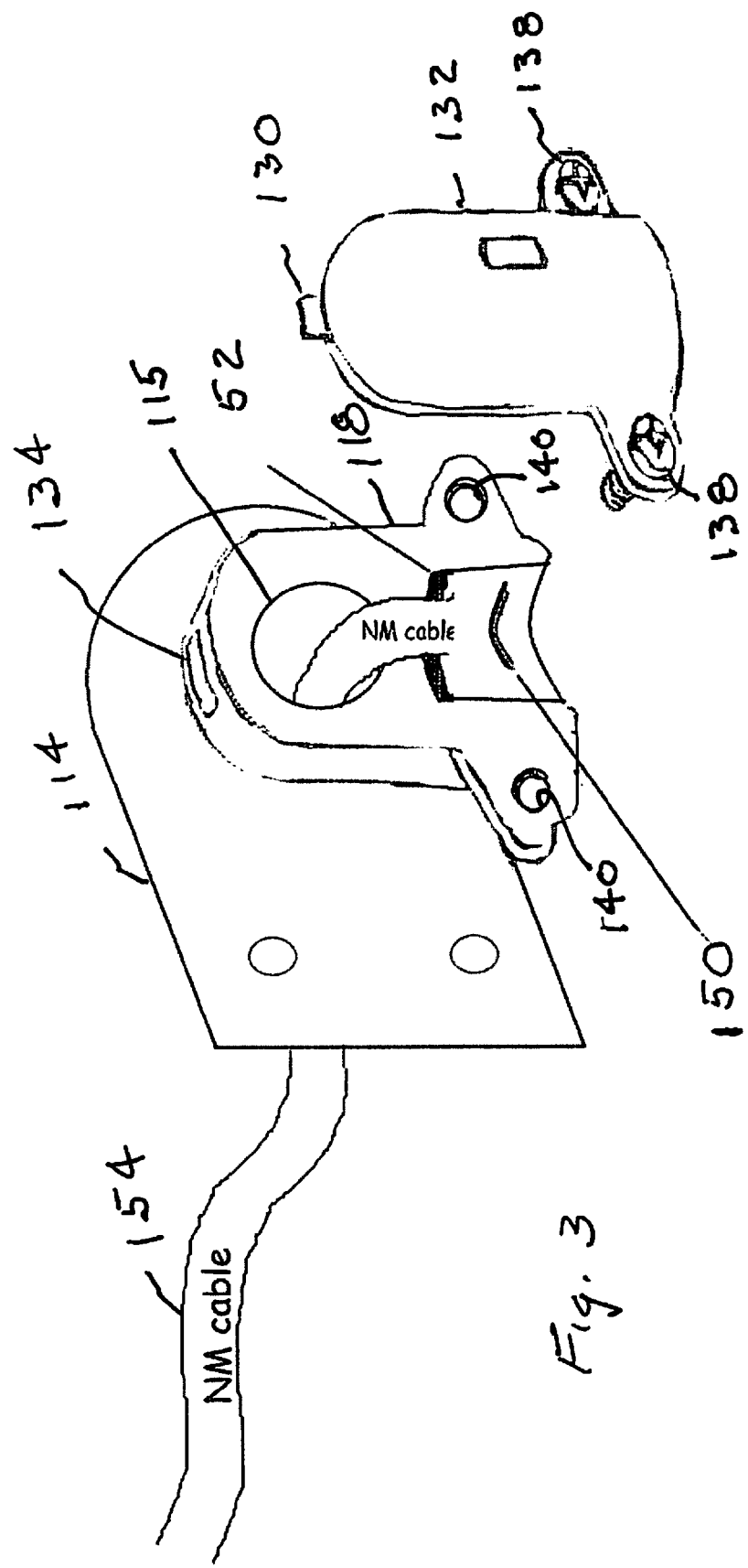
FIG. 3 is an exploded front view of the second embodiment illustrated in FIG. 2.

More particularly, the user of the mounting in accordance with the present invention will position an axial section of flexible metallic conduit 152 around an axial section of flexible non-metallic sheathed cable 154 as shown in FIGS. 2 and 3. The mounting in accordance with the present invention will engage the axial section of flexible metallic conduit (NM cable) 152 through which an axial section of non-metallic sheathed cable 154 extends. For clarity the flexible metallic conduit 152 and NM cable 152 are not shown in FIG. 1. Those skilled in the art will recognize the utilization of those elements in the embodiment of FIG. 1.

The method of installing the mounting in accordance with the present invention will be better understood by a more specific example. The initial installation of wiring for a boiler may have a 3 foot long axial section of nonmetallic shielded cable protruding out a wallboard in the general vicinity of the boiler. The electrician utilizing the mounting in accordance with the present invention will slide an axial section of the flexible metallic conduit 152 over the axial extremity of the NM cable 154 and then slide the mounting of the present invention over the axial extremity of the NM cable 154 with the plate 14 or 114 thereof seated against the wallboard. For example, the flexible metallic conduit 152 might be 2.5 feet (about 75 centimeters) long. That flexible metallic conduit 152 engages the housing 18 or 118 in accordance with the present invention. Accordingly, the axial section of nonmetallic shielded cable protruding from the wallboard is well protected from mechanical damage and the installation may be rapidly achieved.

The mounting in accordance with the present invention includes a clamp 32 or 132 for engaging the flexible metallic conduit 152. The clamp 32 or 132 is carried by a housing 18 or 118 fixed to a plate 14 or 114. More particularly, the housing 18 or 118 is carried on a planar face which may also be referred to as a flat side of the plate 14 or 114 through which a first bore extends. In some embodiments the bore is coaxial with a second bore in the housing 18 or 118. In use the bore is positioned in coaxial relationship with a third bore in a wallboard and a nonmetallic sheathed cable 154 may extend through the third bore in the wall board (not shown) and the first bore in the plate 14 or 114 and rest within the flexible metallic conduit 152 being held by the clamp 32 or 132. The plate 14 or 114 is provided with holes for receiving fasteners to engage the wallboard. The structure is simple to install, provides a substantial support of the flexible metallic conduit 152 and cable 154 and insures that no air gap will exist that would otherwise compromise the integrity of a firewall to which the conduit and cable are attached.

Referring now particularly to FIG. 1 there is shown a first embodiment 10 of the apparatus in accordance with the present invention. This embodiment utilizes a generally planar member or plate 14 having a first bore 15 having a first diameter defined therein. A housing or sleeve 18 has an inside diameter that is greater than the diameter of the first bore 15. The sleeve 18, in the illustrated embodiment has an axis that is substantially perpendicular to the generally planar member 14 and is also substantially coaxial with the bore 15. The intersection of the sleeve 18 and the generally planar member 14 is marked by the reference numeral 16.

A collar or abutment member 20 is disposed within the housing or sleeve 18 and the abutment member substantially abuts the generally planar member 14. In some embodiments the first bore 15 in the plate 14 is the same size as the inside diameter of the abutment member 20 as well as being in coaxial registered relationship with the inside diameter of the abutment member 20. The abutment member 20 has an outside diameter that allows insertion within the housing 18 and an inside diameter that is smaller than the outside diameter thereof whereby the axial extremity of the flexible metallic sheathing of an associated cable (not shown) will abut the abutment member 20 and the conductors thereof (not shown) will pass through the abutment member 20 and the first bore 15. In some preferred embodiments the lower face of the generally planar member 14 is coplanar with the lower face of the abutment member 20.

A clamp carried on the housing 18 is dimensioned and configured for engaging the outer surface of a flexible metallic conduit surrounding an axial part of the associated NM cable. The illustrated preferred embodiment of FIG. 1 includes a clamp having a first cylindrical section 22 that is fixed to the housing 18. That first cylindrical section includes a tab 24 having a slot 24 therein. At a diametrically opposed part thereof an ear 30 extends generally radially.

The clamp further includes a second cylindrical section 32 having a slot 34 dimensioned and configured for engaging the ear 30 of the first cylindrical section 22 whereby a clamping of an associated AC cable disposed between the first and second cylindrical sections 22, 32 when a nut (not shown) engage the threaded hole 36 of the second cylindrical section and the slot 26 of the first cylindrical section 22. Those skilled in the art will recognize that various other clamping structures may be utilized without departing from the spirit of the present invention.

Referring now to FIGS. 2 and 3 there is shown a second embodiment of the invention intended to generally mount the cable in substantially parallel relationship to a wall or the wall board of a wall. Generally the description as well as the figures will most cases correspond to counterpart structure in the embodiment shown in FIG. 1. More particularly, the counterpart of the plate 14 shown in FIG. 1 is plate 114 in FIGS. 2 and 3.

The embodiment of FIGS. 2 and 3 includes a housing 118 having face-to-face contact with the plate 114. A bore 115 extends through the housing 118 as well as the plate 114. An NM cable 154 extends a flexible metal sheath 152, the bore 115 in the housing 118 as well as the bore in the plate 114. The housing 118 includes a cylindrical section shaped recess dimensioned and configured for receiving the axial extremity of the flexible metal sheath 152 as best seen in FIG. 2. FIG. 3 is a partially broken away view that shows a part of the flexible metal sheath 152 within the recess. Some embodiments utilize a rib 150 disposed within the recess that is dimensioned and configured to engage the exterior surface of the flexible metallic sheath 152. In the conventional manner the flexible metallic sheath 152 is constructed with a spiral metallic armor as described in U.S. Pat. No. 2,246,126 issued to George Carlson on Jun. 17, 1941. Thus, the rib 150 engages the helical seam defined in the sheath 152 and thereby helps to prevent axial movement of the sheath 152 with respect to the housing 118.

The sheath 152 is further secured to the housing 118 by a clamp 132 having an ear 130 dimensioned and configured to engage in slot 134 in the housing 118. The clamp 132 further secures the sheath 152 by means of machine screws 138 engaging threaded bores 140 in the housing 140. Similar machine screws are used in the embodiment illustrated in FIG. 1, however, for clarity of the drawing the machine screws are not shown in that figure.

Normally the apparatus of the present invention is a metallic apparatus that cooperates with metallic shielded cable although some embodiments of the present invention may be non-metallic. For the purpose of description of the structure of some embodiments of the present invention the terms "sleeve" and "collar" have been used. It will be understood by those skilled in the art that various embodiments of the present invention may be formed either as a single piece or multiple pieces. Thus, for example, the sleeve and collar may be a single piece or may be, for example, two pieces that are welded together. A preferred embodiment is die cast zinc with a powder coating finish.

Those skilled in the art will recognize that the apparatus of the present invention allows the user to insert an NM cable through the bore 15 and then sleeve the NM cable with flexible metallic conduit. The flexible metallic sheath 152 is slide along the NM cable and inserted into the sleeve 22 until the flexible metallic sheath 152 abuts the collar 20. The flexible metallic sheath 152 is then secured to the sleeve 22 with the clamp 32 via a bolt (not shown) which threads into the threaded hole 36 of the clamp. The plate 14 is then fastened to wallboard to insure that the now armored NM cable will not be subject to movement or stress that would compromise the integrity thereof.

The illustrated preferred embodiment has the sleeve disposed in perpendicular relationship to the plate 14. Other embodiments my join the sleeve 18 to the plate 14 with other orientations. For example, the sleeve 18 may have an axis that is substantially parallel to the plate 14 and an elbow may join the sleeve 18 to the plate 14 in the manner shown in FIGS. 2 and 3.

In a typical installation (not shown) utilizing embodiments of the present invention an electric water heater is connected by a continuous NM cable. The term continuous is used to refer to a cable having no junctions along the axial extent of the wire. The cable runs from an electrical panel along a floor joist, down a wall stud, and protrudes through wall board approximately 4-6 feet. The axial extremity of the NM cable within the room in which the water heater is disposed is positioned within the flexible metallic sheath 152 that cooperates with embodiments of the present invention including a plate 14 or 114 mounted to the wallboard wall of the room in which the water heater is disposed.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for mounting a non-metallic sheathed cable for passage through a passageway in an associated wallboard which comprises:
   providing a flat plate having a first bore extending therethrough;
   aligning said first bore with the passageway;
   providing a flexible metallic sheath;
   providing a housing having a second bore dimensioned for receiving the flexible metallic sheath and communicating with the first bore and having a blocking member therein that blocks axial movement of the flexible metallic sheath and allows passage of the conductors in the non-metallic sheathed cable;

positioning a flexible metallic sheath in the second bore in abutting relationship with the blocking member; and clamping the flexible metallic sheath in the second bore positioning the non-metallic sheathed cable within the axial section of flexible metallic sheath.

2. A method for mounting a nonmetallic sheathed cable protruding from a wallboard which comprises:

providing a mounting for securing the cable which includes a generally planar member having a bore having a first diameter defined therein; a sleeve having an inside diameter that is greater than said first diameter, said sleeve having an axis that is substantially perpendicular to said generally planar member and substantially coaxial with said bore; and a collar disposed within said sleeve and substantially abutting said generally planar member, said collar having an outside diameter that allows insertion within said sleeve and an inside diameter that is smaller than said outside diameter thereof whereby the flexible metallic sheathing of an associated cable will abut said collar and the conductors thereof will pass through said collar and said bore; and a clamp on said sleeve dimensioned and configured for engaging the outer surface of the associated flexible metallic conduit;

sliding the mounting along the axial extent of the protruding nonmetallic sheathed cable and placing the generally planar member in face-to-face contact with the wallboard; sliding an axial section of flexible metallic conduit over the protruding nonmetallic sheathed cable and securing the clamp to the flexible metallic conduit and second generally planar member to the wallboard.

\* \* \* \* \*